United States Patent [19]

Traise

[11] Patent Number: 5,527,416
[45] Date of Patent: Jun. 18, 1996

[54] METHOD FOR FORMING PRESSURE SEAL WITH INTERRUPTED SEALING WHEEL

[75] Inventor: John E. Traise, Palm Bay, Fla.

[73] Assignee: Moore Business Forms, Iwc., Grand Island, N.Y.

[21] Appl. No.: 928,089

[22] Filed: Aug. 13, 1992

Related U.S. Application Data

[63] Continuation of Ser. No. 647,984, Jan. 30, 1991, abandoned.

[51] Int. Cl.⁶ .................................................... B32B 31/20
[52] U.S. Cl. ........................ 156/290; 156/292; 156/306.3; 156/306.6; 156/553
[58] Field of Search ....................... 156/290, 324, 156/306.6, 553, 555, 582, 292, 306.3, 312; 493/208, 264

[56] References Cited

U.S. PATENT DOCUMENTS

| | | |
|---|---|---|
| 2,190,413 | 2/1940 | Davidson . |
| 2,234,223 | 3/1941 | Ball . |
| 2,331,054 | 10/1943 | Shively .................................. 156/209 |
| 2,362,819 | 5/1956 | Hinchey . |
| 2,746,221 | 5/1956 | Rovan et al. . |
| 3,006,257 | 10/1961 | Orsini . |
| 3,068,933 | 12/1962 | Klar . |
| 3,258,385 | 6/1966 | Lake ....................................... 156/290 |
| 3,285,800 | 11/1966 | Bartell et al. ......................... 156/209 |
| 3,320,109 | 5/1967 | Braner .................................. 156/324 |
| 3,350,988 | 11/1967 | Schultz ................................. 156/290 |
| 3,449,196 | 6/1969 | Yumoto et al. . |
| 3,527,632 | 9/1970 | Holes et al. . |
| 3,540,970 | 11/1970 | Huntwork . |
| 3,727,908 | 4/1973 | Whitesell et al. . |
| 3,749,631 | 7/1973 | Batchelder et al. ................... 156/555 |
| 3,953,272 | 4/1976 | Webber . |
| 4,030,960 | 6/1977 | Pratt ..................................... 156/555 |
| 4,033,807 | 7/1977 | Neill et al. . |
| 4,035,984 | 7/1977 | Gerlach ................................ 53/202 |
| 4,085,560 | 4/1978 | McClosky ............................. 156/290 |
| 4,280,865 | 7/1981 | Simonton ............................. 156/555 |
| 4,325,773 | 4/1982 | Schulz . |
| 4,343,129 | 8/1982 | Gunther ................................ 53/206 |
| 4,350,555 | 9/1982 | Popoff . |
| 4,461,661 | 7/1984 | Fabel . |
| 4,466,228 | 8/1984 | Gess ..................................... 156/553 |
| 4,540,458 | 9/1985 | Baughman et al. . |
| 4,557,377 | 12/1985 | Maloney . |
| 4,768,411 | 9/1988 | Su . |
| 4,826,475 | 5/1989 | Eweryd . |
| 4,861,414 | 8/1989 | Vogan . |
| 4,919,738 | 4/1990 | Ball et al. . |

FOREIGN PATENT DOCUMENTS

| | | |
|---|---|---|
| 1197155 | 11/1985 | Canada . |
| 0415415 | 3/1991 | European Pat. Off. . |
| 0643250 | 4/1937 | Germany ............................. 156/209 |
| 3835953 | 4/1990 | Germany . |

Primary Examiner—Daniel J. Stemmer
Attorney, Agent, or Firm—Nixon & Vanderhye

[57] ABSTRACT

Apparatus and related method for activating pressure sensitive adhesive on predetermined portions of a first sheet in order to fasten the first sheet to a second sheet are provided which include at least one sealer wheel formed with an interrupted surface pattern for applying pressure along the adhesive to effect a rhythmically interrupted sequence of sealed spots between the first and second sheets.

10 Claims, 3 Drawing Sheets

METHOD FOR FORMING PRESSURE SEAL WITH INTERRUPTED SEALING WHEEL

This is a continuation of application Ser. No. 07/647,984, filed Jan. 30, 1991, now abandoned.

BACKGROUND AND SUMMARY OF THE INVENTION

This invention relates to apparatus used in the production of business forms and, more particularly, to uniquely designed sealing wheels utilized to activate pressure sensitive adhesives typically used to secure two or more sheets or plies of a multi-layer business form. The invention also relates to a method of utilizing such sealing wheels in the production of forms or the like.

In the production of business forms, it is often the case that a multi-layer form (including one or more removable inserts) requires perimeter sealing, i.e., sealing along as few as one or as many as four marginal edge portions of the form, but not in the central area of the form, within the marginal edge portions. This is often accomplished through the use of pressure sensitive adhesive selectively applied along such marginal edge portions. In a system developed by the assignee of this invention, multiple two wheel or roller pairs are employed in close sequence to effect the activation of the pressure sensitive adhesive at each of the sealing positions of the sealing apparatus. In order to produce a secure seal, the wheel pairs require loading on the order of 200 pounds per lineal inch of sealing width. This load must be managed with adequate steering of the plies of the form to be sealed in order to maintain tolerable register between the plies so as to prevent one ply from "creeping" sideways. In addition, the loading of the wheel or roller pairs must be carried out in such a way as to effect perimeter sealing without localized stretch of the paper of one or more of the plies.

Further problems which exacerbate the out-of-register condition are the difficulties encountered in attempting to achieve perfectly parallel tracking of the pressure wheels, and equally significant difficulties in attempting to assure that the multiple layers of the form are fed in perfect synchronism.

The effect of inadequate pressure, of course, will be that an inadequate seal is produced. At the same time, unequal web feeding could create a void or pucker in one or more corners of the form after exiting the sealer apparatus. Moreover, excessive pressure could produce paper stretch in the seal line area which would be asthetically unacceptable, and could cause stacking and handling problems in successive equipment, such as mail sorting machinery.

The present invention seeks to alleviate or eliminate these problems by utilizing a modified pressure wheel in each of the multiple two roller pairs. The modified pressure wheel in one exemplary embodiment of the invention is formed with a plurality of teeth similar to a helical gear about its peripheral edge sealing surface in order to effect an interrupted seal line along the pressure sensitive adhesive strip on the form. The purpose of the plurality of teeth is to increase the actual sealing pressure on the adhesive strip while, at the same time, allowing each incrementally small feed error on one or both of the plies to "escape" between the teeth of the sealing couple as it is processed through the sealer system. This increase of sealing pressure is directly proportional to the inverse ratio of tooth length to tooth-to-tooth pitch spacing. Additionally, the purpose of the helical gear cut is to maintain a contact angle greater than one-to-one which will operate as smoothly as a plain (smooth) wheel as long as the lateral contact across the face of the wheel pair is tolerably even.

In a preferred embodiment, the lower wheel or roller in each of two successive roller pairs is formed in the manner of a helical gear with the helix angle of the teeth on the first of the wheels arranged so as to extend substantially perpendicularly relative to the helix angle of the teeth on the second of the successive gears. In this manner, a cross hatch pattern is impressed on the pressure sensitive adhesive strip to thereby activate the pressure sensitive adhesive in the cross hatched areas, while leaving spaces between the cross hatching unactivated.

It will also be appreciated that greater or lesser degrees of adhesion can be achieved by varying spacing between the helical gear teeth formed on the sealing wheels or rollers. In other words, decreasing the spacing between teeth will increase the degree of adhesion, while increasing the space between the teeth will decrease the degree of adhesion, resulting in an easy open type form.

In the production of business forms, it is well known that such forms can be produced in continuous web form or in individual cut form. In either case, where pressure sensitive adhesive strips have been applied along transversely spaced longitudinal marginal edge portions of the form and/or web, multiple two wheel pairs are employed with a first set in lateral alignment, and a second set also in lateral alignment, but located downstream of the first set. In other words, at a first station, two identical wheel pairs each comprising a smooth upper roller and a patterned lower roller will simultaneously effect partial activation of the pressure sensitive adhesive applied along both longitudinal marginal edge portions of the form. Downstream of this first station, two identical wheel pairs (identical to each other but with helix angles perpendicular to the helix angles of the wheels at the first station) will effect the final activation of the pressure sensitive adhesive along both longitudinal marginal edge portions in the cross hatch pattern described hereinabove. In the event longitudinally spaced, transverse pressure sensitive adhesive strips are applied to the form, a similar arrangement of sealer wheels may be employed to activate the adhesive, after the form has been turned ninety degrees with respect to its original direction of movement.

A system as described above but without the patterned rollers described herein, is disclosed in commonly assigned copending application Ser. No. 07/417,775 filed Oct. 6, 1989 now U.S. Pat. No. 5,397,427. It will be appreciated, however, that the pressure sealing wheels in accordance with this invention can be utilized in many other pressure sealing systems as well.

Thus, in its broader aspects, the present invention relates to apparatus for effecting activation of pressure sensitive adhesive applied to predetermined portions of a business form, the improvement comprising pressure imparting surface means for providing a selectively interrupted pattern of pressure in the predetermined portions of the form.

In another aspect, the invention provides apparatus for activating pressure sensitive adhesive on predetermined portions of a first sheet in order to fasten the first sheet to a second sheet comprising means for applying pressure along the adhesive to effect a rhythmically interrupted sequence of sealed spots between the first and second sheets.

In another aspect of the invention, there is provided apparatus for applying pressure to a business form to activate pressure sensitive adhesive applied along at least one strip portion of the form to seal one part of the form to another, comprising a frame; and a pressure applying device operatively connected to the frame; the pressure applying device comprising means for applying pressure along a first strip while simultaneously conveying business forms therethrough, including a first set of narrow width upper and lower sealing rollers forming a nip, the upper roller disposed above and in peripheral engagement with the lower roller along a common vertical center line, one of the upper and lower rollers having an interrupted pattern formed on a pressure applying surface thereof.

In still another aspect of the invention, there is provided, broadly, a method of handling business forms, each having at least one strip of pressure sensitive adhesive of a predetermined width for fixing one part of the business form to another part, comprising the step of (a) automatically, in a continuous, sequential manner, acting on successive business forms to apply a force thereto in an interrupted pattern along the strip sufficient to activate selected portions of the pressure sensitive adhesive to fix one part of the form to another, the force being applied only to the approximate area of the predetermined width of adhesive.

In a related aspect, the invention relates to a method of activating at least one pressure sensitive adhesive strip for securing a first paper ply to a second paper ply comprising the steps of a) providing at least a first set of sealing rollers comprising an upper roller and a lower roller, each of which have pressure applying peripheral surfaces substantially equal to a width dimension of the strip, the pressure applying peripheral surface of one of the rollers comprising a first raised pattern extending about the circumference of the one roller; and b) feeding the first and second plies through the first set of sealing rollers, to thereby activate only portions of the pressure sensitive adhesive strip corresponding to the first raised pattern.

In still another aspect, the invention relates to a method of activating pressure sensitive adhesive strips for securing two sheets together along selected strip portions thereof without causing undesirable paper stretching, comprising the steps of a) providing at least a first set of sealing wheels comprising an upper wheel and a lower wheel, each of which have pressure applying peripheral surfaces substantially equal to a width dimension of said strip, the pressure applying peripheral surface of one of the wheels comprising a raised pattern extending about the circumference of the one wheel; and b) feeding the first and second plies through the first set of sealing wheels, to thereby activate only portions of the pressure sensitive adhesive strip corresponding to the raised pattern.

Other objects and advantages will become apparent from the detailed description of the invention which follows.

DETAILED DESCRIPTION OF THE DRAWINGS

Figure 1:
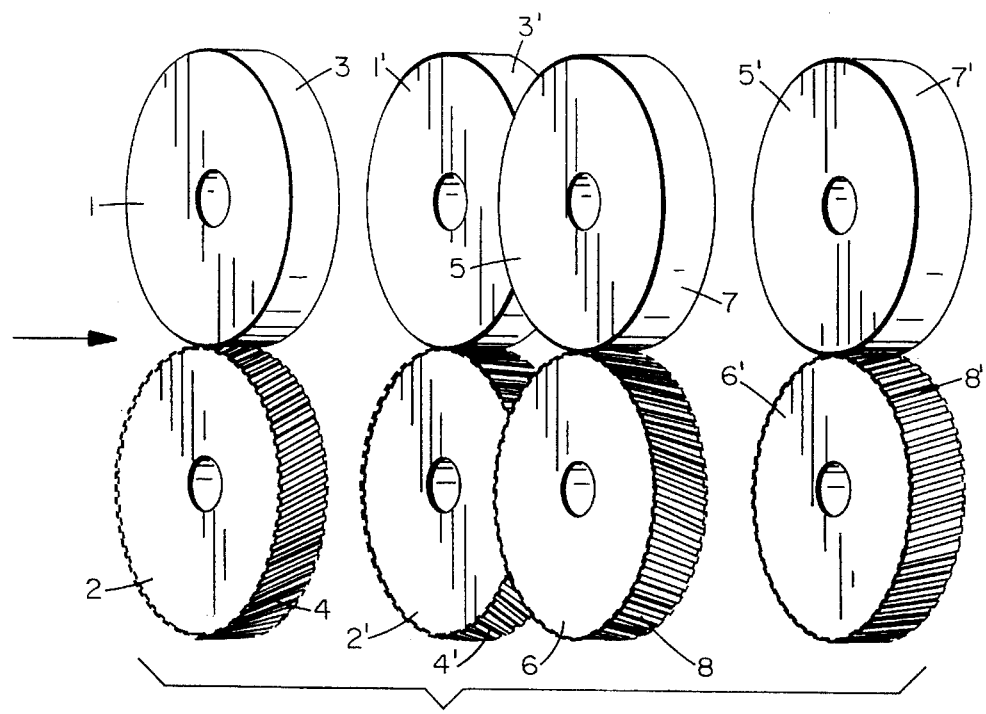
FIG. 1 is a perspective view of an arrangement of multiple two wheel pairs for use in apparatus used to activate pressure sensitive adhesive strips in accordance with an exemplary embodiment of the invention.

Referring now to FIG. 1, successive multiple wheel or roller pairs are illustrated, a first set of which comprises an upper wheel 1 and a lower wheel 2, the upper wheel 1 having a smooth peripheral sealing surface 3, and the lower wheel 2 having a patterned sealing surface 4 as will be described in further detail hereinbelow.

A downstream set of wheels includes an upper wheel 5 and a lower wheel 6, the upper wheel 5 having a smooth peripheral sealing surface 7, and the lower wheel 6 having a patterned peripheral sealing surface 8, as will be described further below.

Laterally aligned sets of wheels are also shown in FIG. 1, with similar reference numerals—but with a prime designation added—used for similar elements. This is an arrangement which may be used to activate pressure sensitive adhesive strips along, for example, transversely spaced, longitudinal marginal edge portions of a form.

Figure 2:
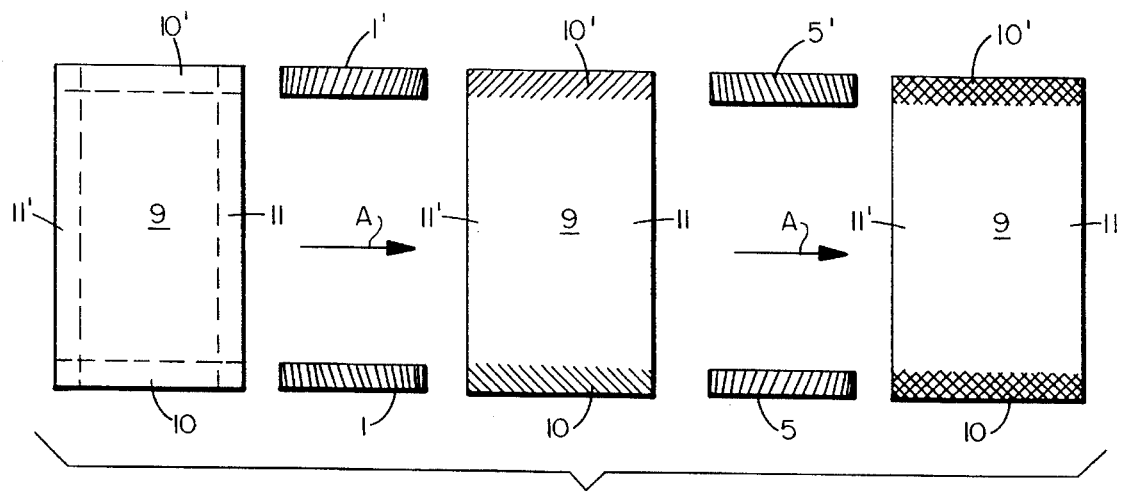
FIG. 2 is a plan view of the sealing wheel pairs as shown in FIG. 1, but with a business form added to illustrate the sealing function.

With reference now to FIG. 2, the lower wheel of each set of wheels is shown in conjunction with a form having transversely spaced, longitudinal marginal edge portions 10, 10' which extend in a direction parallel to the direction of movement of the form, i.e., in the direction indicated by arrow A. It will be appreciated that in FIG. 2, the upper wheels 1, 1' of the "upstream" sets of wheels and the upper wheels 5 and 5' of the "downstream" sets of wheels have been omitted for clarity. Upon introduction into the nip between the upstream sets of rolls, pressure is applied along the marginal edge portions 10, 10' only of the form 9 in order to activate the pressure sensitive adhesive in these marginal edge portions in a rhythmically interrupted pattern defined by the helical gear teeth formed on the wheels 2 and 2'. This is evident in the form 9 as it appears in FIG. 2 between the upstream and downstream sets of wheels. In this exemplary embodiment, it may be seen that the activation pattern extends in a single direction only for each of the marginal edge portions 10 and 10'. Subsequently, the form 9 is introduced into the nips between the downstream sets of rollers where pressure is applied to the longitudinal marginal edge portions 10 and 10' in a pattern as defined by the helical gear teeth on wheels 6 and 6', the patterns extending in a direction substantially perpendicular to the patterns impressed by the upstream sets of wheels so that, as shown in the far right of FIG. 2, a cross-cross or cross-hatch pattern of activation has been applied to the adhesive in the marginal edge portions 10 and 10'.

It will be understood that the form 9 is composed of at least two sheets, with pressure sensitive adhesive applied to one (or both) of the sheets, in facing relation to the other, in the area of longitudinal marginal edge portions 10 and 10'. The form may also have pressure sensitive strips in the area of transverse marginal edge portions 11 and 11', depending on the particular form construction. In order to effect pressure sealing of the transverse marginal edge portions 11 and 11', the form may be conveyed at a 90° angle relative to arrow A after exiting the downstream wheel sets as shown in FIG. 2, and fed through additional wheel sets arranged similarly to those shown in FIG. 2, but with their respective axes of rotation extending perpendicularly thereto.

The patterned surfaces of wheels 4 and 5 (and 4', 5') are, in the exemplary embodiment described above, provided in the form of helical gear teeth, with the helix angles being of opposite hand in the downstream wheel sets. In other words, if surface 4 of wheel 2 is provided with a right hand helix angle of, for example about 44°, then surface 8 of wheel 6 would have a left hand helix angle of about 44°. This arrangement produces the criss-cross, or cross-hatch, pattern on the marginal edge portions of the form as seen at the far right of FIG. 2.

By this arrangement, activation of the pressure sensitive adhesive is interrupted in a regular pattern, so that any small feed errors in one or both of the plies being secured, are taken up in the areas between the teeth of the sealer wheels, i.e., in the non-activated portions of the pressure sensitive adhesive strips.

In an exemplary embodiment, wheels 2 and 6 have diameters of just over 3 inches (3.196 inches), with 110 teeth formed about the periphery of surfaces 4, 8, respectively. As noted above, helix angles may be about 44° (43.95°), cut to a depth of 0.024 to provide a 0.042/0.042 (or 1) tooth to space ratio at the gear O.D. The hob pressure angle in this exemplary embodiment may be 20 degrees, with a hob diametrical pitch of 48.

After the gear teeth are cut into the wheels, they may be flame hardened about the outer peripheral sealing surfaces to RC 48–50.

It will be understood that the above described specifications are exemplary only, and are not necessarily critical to the operability of the invention.

For example, the number of teeth and the space between the teeth may be varied, depending on the degree of adhesion required. In other words, where an easy tear off sheet is desired, the tooth spacing may be increased to thereby result in less of the adhesive being pressure activated. Similarly, where greater adhesion is required, the tooth spacing may be decreased to activate a greater percentage of the adhesive.

It is also possible to vary the helix angle. The exemplary embodiment results in less chatter or noise, but other helix angles may produce equally satisfactory results.

It is further contemplated that other patterns (other than "helical gear teeth") may be formed in the sealer wheels which would nevertheless produce an interrupted pattern of activation of the pressure sensitive adhesive. For example, a diamond shaped pattern could be provided on the upstream wheel sets which would eliminate the need for the downstream wheel sets.

Figure 3:
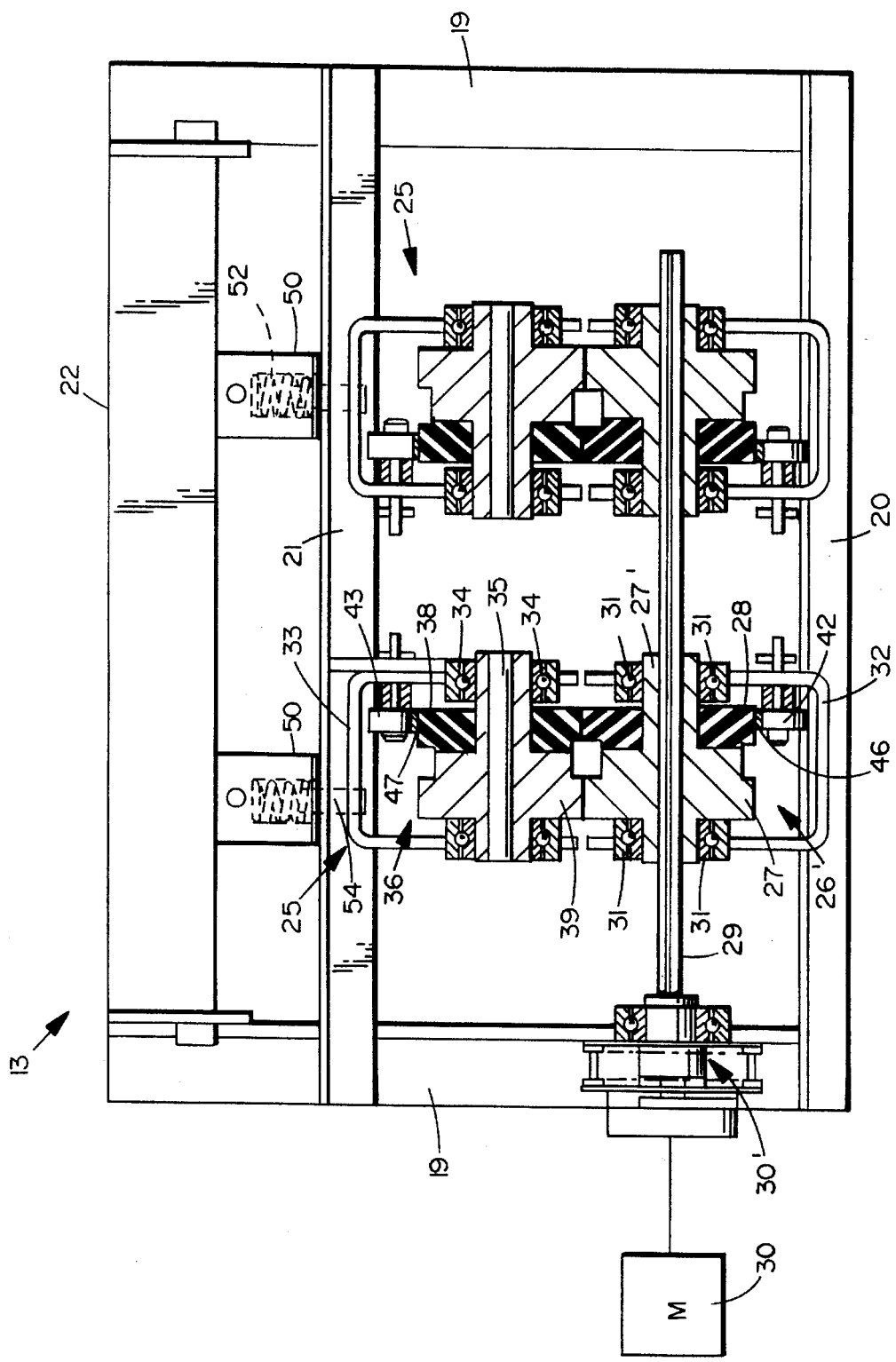
FIG. 3 is an end view of a sealing device, partly in cross-section and partly in elevation, of the type which may incorporate the sealing wheels shown in FIGS. 1 and 2.
Figure 4:
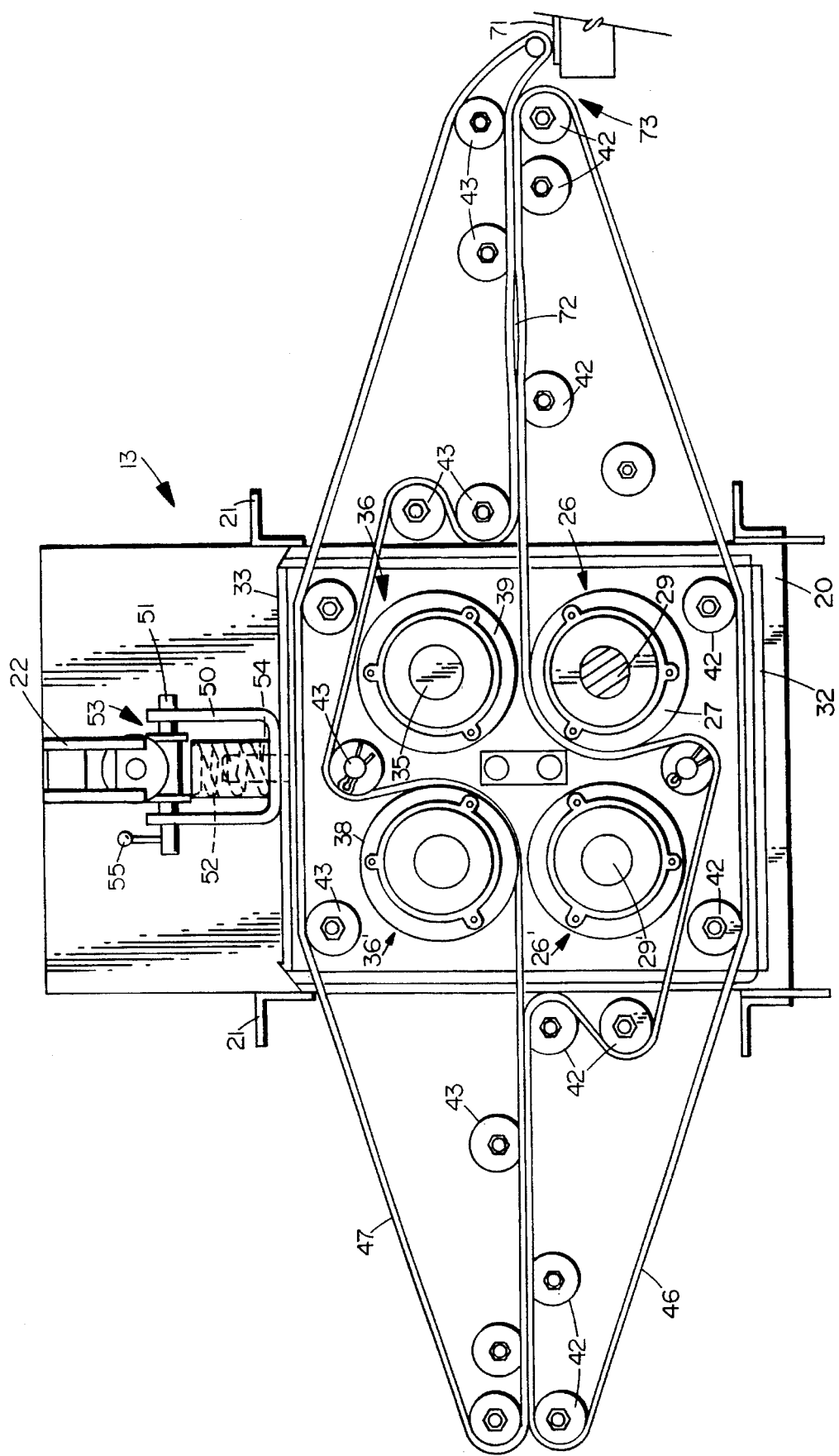
FIG. 4 is a side view of the device of FIG. 3.

An exemplary pressure sealing device 13 which may incorporate the above described sealer wheel sets is shown according to the invention can be seen in FIGS. 3 and 4. Each device 13, as disclosed in copending application Ser. No. 07/417,775, comprises a frame 19 that is stationary, including a bottom support 20, a reinforcing cross-brace 21, and a top truss bar 22 against which spring or hydraulic pressure (hereinafter described) is applied. At least one pressure applying device, shown by reference numeral 25, is operatively connected to the frame. Preferably two such devices are provided horizontally spaced from each other in a dimension perpendicular to the dimension of movement of forms through the device 13. Hydraulic pressure would typically be used in a plant environment, and spring pressure in an office environment.

Each pressure applying device 25 includes at least one lower wheel 26, and preferably two lower wheels (26, 26' in FIG. 4). For exemplary purposes of this invention, the wheels 2 and 6 would be substituted for wheels 26 and 26' as shown in FIG. 4, and wheels 2' and 6' would be substituted for the corresponding, laterally aligned (unnumbered) wheels, one of which is shown in FIG. 3 in lateral alignment with wheel 26'. Each lower wheel (26) has peripheral portions 27, 28 with a recess therebetween. Preferably the diameter of the wheel portions 27, 28 is slightly over three inches, having a circumference of about ten inches. This is a relatively large diameter so as to provide an approach angle at the nip between the lower wheel 26 and the upper wheel (to be hereinafter described) as low as possible. The diameter of wheel 26 (the second in the direction of conveyance of the forms) may be the same as, or very slightly greater than, that of wheel 26' to provide a slight tension on the forms, as a form set being processed from first sealing couple 26–36 to second sealing couple 26'–36'.

The wheel 26 is mounted for rotation on a shaft 29, which preferably is a splined shaft. The shaft 29 is horizontal and essentially perpendicular to the direction of movement of the forms through the device 13. The shaft 29 is rotated by a conventional electric motor 30 (FIG. 3) or the like. A conventional belt or gear assembly 30' connects shafts 29, 29' so that they are simultaneously driven by motor 30.

Bearings 31 are provided for mounting the ends of the wheel 26 for rotation about the axis defined by shaft 29, the bearings being received within a U-shaped support 32 which is maintained stationary during rotation of the shaft 29. The support 32 may engage the bottom plate 20, or other part of the frame 19, so that it is supported thereby yet it must be slideable with respect to the frame 19 in order to adjust the spacing between the devices 25 mounted on the common shaft 29. Typically the device 13 would be set up on a center line register arrangement, with the spacing between the devices 25 being dependent upon business form dimensions and geometry.

An upper U-shaped support 33 is provided having bearings 34 for mounting the shaft extensions 35 of an upper wheel 36 which cooperates with the bottom wheel 26. The upper wheel 36 has peripheral portions 38, 39 separated by a recess, for cooperating with the peripheral portions 28, 27, respectively, of the lower wheel 26. Wheel portions 28, 38 are both of elastomeric material (e.g. urethane O-rings), while 27, 39 are of metal (e.g. steel). The elastomeric material engagement causes the rolls to rotate even when the actual sealing wheels are out of engagement. The elastomeric material also provides a resilient cushion to reduce the impact noise which would otherwise occur when the paper forms pass from a roll couple.

As can be seen in both FIGS. 3 and 4, the device 13 also includes a plurality of relatively small diameter accessory wheels 42, 43, the set 43 being associated with the lower wheels 26, and the set 43 with the upper wheels 36. A conveyor tape 46 cooperates with the lower wheels 26 and their accessor wheels 42, while a conveyor tape 47 cooperates with the upper wheels 36 and their cooperating wheels 43. The wheels 42, 43 are all rotatable about horizontal axes parallel to the shaft 29. The conveyor tapes 46, 47 are preferably about ⅝ of an inch in width and are of reinforced plastic or like material conventionally used for conveyor belts. The wheels 42 are mounted on the support 32, or extensions thereof, while the wheels 43 are mounted on the support 33 or extensions thereof.

The tapes 46, 47 engage the lower wheel portion 28 and upper wheel portion 38, respectively, and are driven by rotation of the wheels 26. The elastomeric nature of the peripheral portions 28, 38 of the wheels 26, 36 provides a secure engagement between the wheels 36, 26, and with the conveyor tapes 46, 47. The conveyor tapes 46, 47 are mounted interiorly of the devices 25, that is they cooperate with the interior peripheral surfaces 28, 38 rather than the exterior ones 27, 39.

There is also provided a force applying means for applying the force between the frame and the upper wheels 36 so that the periphery of the upper wheels 36 is operatively pressed into engagement with the periphery of the lower wheels 26. Such force applying means may be a hydraulic element, but preferably—for simplicity—comprises spring means as illustrated in FIGS. 3 and 4. Such force applying means in the preferred embodiment includes a U-shaped bracket 50 mounting a rotatable shaft 51 therein, with a coil spring 52 received within the bracket 50 and acting between the bottom of the bracket 50 and a cam 53 mounted on the shaft 51. The bottom of the bracket 50 is connected by extension 54 to the support 33, while the cam 53—in the operative position thereof—engages the channel 22 of the stationary frame 19. A handle 55 allows rotation of the shaft 51 to move the cam from an "on" position wherein it compresses the spring 52 and causes the springs to apply a downward force to the upper wheel 36, and an "off" position in which it does not compress the spring 52, and therefore no spring force (only a relatively small gravitational force) biases the upper wheel 36 downwardly. Normally the springs 52 urge the top wheels 36 into actual engagement with the wheels 26. However, a mechanical stop (not shown) may be provided so that a small clearance (less than a double thickness of paper) is provided (i.e. the wheels 36 are operatively biased into engagement with the lower wheels 26).

It should be appreciated that the upper wheels 36 are entirely distinct from the lower wheels 26, and from the frame 19, having no positive or rigid connections thereto. Also the driving action for rotating the wheels 26, 36, and for powering the conveyor tapes 46, 47 is provided solely by rotation of the shaft 29 by the motor 30. The frictional engagement between the lower wheel peripheral surface 28 and the upper wheel peripheral surface 38 under the influence of the force provided by the spring 52 causes the lower wheel 26 to drive the upper wheel 36. Similarly the frictional engagement between the tapes 46, 47 and the wheels 26, 27 and 42, 43, respectively, provides the driving action for the tapes 46, 47 which engage the business forms and convey them to the nip between the metal wheel portions 27, 39 (which effect the seal).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of handling business forms, each having at least one strip of pressure sensitive adhesive of a predetermined width for fixing one part of the business form to another part, comprising the step of (a) automatically, in a continuous, sequential manner, acting on successive business forms with a tool having a surface with a raised, interrupted pattern thereon, said tool arranged to apply a force by means of said raised interrupted pattern continuously along said at least one adhesive strip sufficient to activate only those portions of the adhesive within said at least one pressure sensitive adhesive strip corresponding to said raised interrupted pattern to thereby fix said one part of the form to said another part, the force being applied only along said predetermined width of said at least one pressure sensitive adhesive strip.

2. A method as recited in claim 1 wherein the business forms each have first and second generally parallel strips of pressure sensitive adhesive each of a predetermined width, and wherein step (a) is practiced so as to apply an activating force of about 200 pounds per lineal inch to both the first and second adhesive strips of each form simultaneously, the force only being applied to the approximate areas of the predetermined widths.

3. A method as recited in claim 2 wherein each business form has a third and fourth strip of pressure sensitive adhesive generally perpendicular to said first and second strips, and of a predetermined width; and comprising the further step (b), after step (a), of, in a continuous, sequential manner, acting on successive business forms to apply a force of about 200 pounds per lineal inch thereto, sufficient to activate selected portions of the pressure sensitive adhesive of the third and fourth strips to fix one part of the form to another, the force being applied only to the approximate area of the predetermined width of adhesive of the third and fourth strips.

4. A method of activating at least one pressure sensitive adhesive strip for securing a first paper ply to a second paper ply comprising the steps of:

a) providing at least a first set of sealing wheels comprising an upper wheel and a lower wheel, each of which has a pressure applying peripheral surface substantially equal to a width dimension of said strip, the pressure applying peripheral surface of one of said wheels comprising a first raised pattern extending about the circumference of said one wheel and the pressure applying peripheral surface of the other of said wheels comprising a smooth surface; and b) feeding said first and second plies through said first set of sealing wheels, while simultaneously biasing said first set of wheels together with a force of about 200 pounds per lineal inch, sufficient to activate only those portions of said pressure sensitive adhesive strip corresponding to said first raised pattern continuously along said strip.

5. The method of claim 4 wherein said first and second plies are to be sealed along two parallel pressure sensitive adhesive strips, and wherein in step a), a second set of sealing wheels is provided which is substantially identical to, and in laterally spaced alignment with, said first set of wheels, said first and second set of wheels arranged to simultaneously engage said two parallel strips, respectively, therebetween.

6. The method of claim 5 and wherein third and fourth sets of wheels each comprising an upper wheel and a lower wheel are provided in laterally spaced alignment downstream of said first and second sets of wheels, each wheel of said third and fourth sets of wheels having a peripheral pressure applying surface, the peripheral pressure applying surface of one wheel in each of said third and fourth sets of wheels being provided with second raised patterns which cooperate with said first raised patterns to establish a crisscross pattern of activated pressure sensitive adhesive within said two parallel strips.

7. The method of claim 6 wherein said first and second raised patterns are formed by machining helical gear teeth into said peripheral pressure applying surfaces.

8. The method of claim 7 wherein the peripheral pressure applying surface of the other wheel in each of said third and fourth sets of wheels has a substantially smooth peripheral pressure applying surface.

9. The method of claim 4 wherein said first raised pattern is formed by machining helical gear teeth into said pressure applying peripheral surface.

10. The method of claim 9 and including the step of varying space between said teeth as a function of a predetermined degree of adhesion to be provided between said first and second plies.

* * * * *